(12) United States Patent
Griessler

(10) Patent No.: US 10,758,869 B2
(45) Date of Patent: Sep. 1, 2020

(54) FLUID PURIFICATION BY FORWARD OSMOSIS, ION EXCHANGE AND RE-CONCENTRATION

(71) Applicant: FLUVICON GMBH, Leoben (AT)

(72) Inventor: Thomas Griessler, Graz (AT)

(73) Assignee: FLUVICON GMBH, Leoben (AT)

( * ) Notice: Subject to any disclaimer, the term of this patent is extended or adjusted under 35 U.S.C. 154(b) by 23 days.

(21) Appl. No.: 15/752,555

(22) PCT Filed: Aug. 12, 2016

(86) PCT No.: PCT/EP2016/069298
§ 371 (c)(1),
(2) Date: Feb. 13, 2018

(87) PCT Pub. No.: WO2017/029243
PCT Pub. Date: Feb. 23, 2017

(65) Prior Publication Data
US 2019/0022591 A1 Jan. 24, 2019

(30) Foreign Application Priority Data

Aug. 14, 2015 (EP) .................................. 15181170

(51) Int. Cl.
*B01D 61/58* (2006.01)
*B01D 61/00* (2006.01)
(Continued)

(52) U.S. Cl.
CPC .......... *B01D 61/58* (2013.01); *B01D 61/002* (2013.01); *B01D 61/243* (2013.01);
(Continued)

(58) Field of Classification Search
None
See application file for complete search history.

(56) References Cited

U.S. PATENT DOCUMENTS

| 3,906,250 A | 9/1975 | Loeb |
| 4,141,825 A | 2/1979 | Conger |

(Continued)

FOREIGN PATENT DOCUMENTS

| CN | 1856447 A | 11/2006 |
| CN | 102190381 A | 9/2011 |

(Continued)

OTHER PUBLICATIONS

Brown, Craig J. et al.; "Chloride Removal from Kraft Liquors Using Ion Exchange Technology"; TAPPI Environmental Conference; Apr. 30, 1998; 12pp.

(Continued)

*Primary Examiner* — Hayden Brewster
(74) *Attorney, Agent, or Firm* — Lewis Roca Rothgerber Christie LLP

(57) ABSTRACT

An apparatus (100) for purifying fluid, wherein the apparatus (100) comprises an osmosis unit (102) configured for pre-purifying the fluid to be purified by forward osmosis of the fluid, which is to be purified, through an osmosis membrane (104) into a chamber (106) comprising dissolved first ions, in particular first cations and first anions, an ion exchange unit (108) configured for exchanging at least part of the first ions, in particular at least part of at least one of the first cations and the first anions, by second ions, in particular at least one of second cations and second anions, and a re-concentration unit (110) configured for separating the pre-purified fluid after the ion exchange into purified fluid and into a re-concentrate enriched with the respective ions, in particular anions and cations.

19 Claims, 1 Drawing Sheet

(51) Int. Cl.
| | |
|---|---|
| *B01D 61/24* | (2006.01) |
| *B01D 61/42* | (2006.01) |
| *C02F 1/42* | (2006.01) |
| *C02F 1/44* | (2006.01) |
| *B01D 61/02* | (2006.01) |
| *B01J 39/00* | (2006.01) |
| *B01J 41/00* | (2006.01) |
| *B01J 49/00* | (2017.01) |
| *C02F 103/08* | (2006.01) |

(52) U.S. Cl.
CPC ............ *B01D 61/422* (2013.01); *B01J 39/00* (2013.01); *B01J 41/00* (2013.01); *B01J 49/00* (2013.01); *C02F 1/42* (2013.01); *C02F 1/445* (2013.01); *B01D 61/025* (2013.01); *B01D 61/027* (2013.01); *B01D 2311/04* (2013.01); *B01D 2311/06* (2013.01); *B01D 2311/2623* (2013.01); *C02F 1/441* (2013.01); *C02F 2001/422* (2013.01); *C02F 2001/425* (2013.01); *C02F 2103/08* (2013.01)

(56) References Cited

U.S. PATENT DOCUMENTS

| | | | |
|---|---|---|---|
| 5,098,575 | A | 3/1992 | Yaeli |
| 7,901,577 | B2 | 3/2011 | SenGupta et al. |
| 2005/0145568 | A1 | 7/2005 | Mc Ginnis |
| 2010/0155333 | A1 | 6/2010 | Husain et al. |
| 2010/0224476 | A1* | 9/2010 | Cath ............ B01D 1/221 203/10 |
| 2011/0114558 | A1* | 5/2011 | Al-Mayahi .......... B01D 61/002 210/644 |
| 2011/0220561 | A1 | 9/2011 | Katayama et al. |
| 2014/0042091 | A1 | 2/2014 | Graf |
| 2014/0224718 | A1 | 8/2014 | Hancock et al. |
| 2014/0346105 | A1 | 11/2014 | Tsukamoto |
| 2015/0060361 | A1 | 3/2015 | Jung et al. |

FOREIGN PATENT DOCUMENTS

| | | |
|---|---|---|
| CN | 103438423 A | 12/2013 |
| CN | 103476485 A | 12/2013 |
| EP | 2 644 572 A1 | 10/2013 |
| EP | 2644572 A1 | 10/2013 |
| GB | 2 249 307 A | 5/1992 |
| WO | 2005012185 A1 | 2/2005 |
| WO | WO 2005/012185 A1 | 2/2005 |
| WO | WO 2010/067063 A1 | 6/2010 |
| WO | WO 2011/059751 A2 | 5/2011 |
| WO | WO 2011/059751 A3 | 5/2011 |
| WO | WO 2014/052025 A1 | 4/2014 |

OTHER PUBLICATIONS

Llenas, Laia et al.; "Nanofiltration as pretreatment for scale prevention in seawater reverse osmosis desalination"; Desalination and Water Treatment; 36; 2011; pp. 310-318.

Pal, Madhubonti et al.; "Purifying fluoride-contaminated water by a novel forward osmosis design with enhanced flux under reduced concentration polarization"; Environ Sci Pollut Res; 2015; 22; pp. 11401-11411.

Vanoppen, Marjolein et al.; "Increasing RO efficiency by chemical-free ion-exchange and Donnan dialysis: Principles and practical implications"; Water Research; May 8, 2015; pp. 59-70.

European Search Report for corresponding European Patent Application No. 15181170.0, dated Jan. 29, 2016; 13pp.

International Search Report and Written Opinion for corresponding International Application No. PCT/EP2016/069298; dated Nov. 25, 2016; 16pp.

International Search Report and Written Opinion for corresponding International Application No. PCT/EP2016/069305; dated Feb. 13, 2017; 20pp.

International Search Report and Written Opinion for corresponding International Application No. PCT/EP2017/053078; dated Sep. 7, 2017; 27pp.

Invitation to Pay Additional Fees and Communication Relating to the Results of the Partial International Search for corresponding International Application No. PCT/EP2017/053078; dated May 31, 2017; 16pp.

Invitation to Pay Additional Fees and Communication Relating to the Results of the Partial International Search for corresponding International Application No. PCT/EP2016/069305; dated Dec. 22, 2016; 8pp.

* cited by examiner

FLUID PURIFICATION BY FORWARD OSMOSIS, ION EXCHANGE AND RE-CONCENTRATION

CROSS-REFERENCE TO RELATED APPLICATION(S)

This application is a National Phase Patent Application and claims priority to and the benefit of International Application Number PCT/EP2016/069298, filed on Aug. 12, 2016, which claims priority to European Patent Application Number 15181170.0, filed on Aug. 14, 2015, the entire contents of all of which are incorporated herein by reference.

The invention relates to an apparatus for and a method of purifying fluid.

Conventionally, membrane separation procedures, in particular based on reverse osmosis, are applied for purifying fluid such as water. In such a procedure, a pressure is applied to the entire raw fluid together with all contaminants being thereby pressed against the membrane. Since the pores of the membrane are too small for allowing the contaminants to pass the pores, the contaminant will accumulate directly at the membrane. This may cause problems such as fouling and scaling, and after some time damage of the membrane. For this reason, it is required to pre-treat or pre-process the raw fluid to be purified before it is brought in interaction with the reverse osmosis membrane. This preprocessing may involve sieving, adding chemicals (for coagulation and flocculation), sedimentation, filtering (for instance using sand, in a single stage or a serial dual stage configuration), addition of antiscalants, and microfiltration. This is cumbersome and requires a considerable amount of energy.

An alternative procedure of purifying fluid such as water is a thermal treatment based on the principle of distillation, in particular multi stage flash distillation (MSF). Although this process is reliable, it involves an even higher energy consumption (for instance 7 to 10 kWh/m$^3$) than reverse osmosis.

U.S. Pat. No. 5,098,575 discloses a method and an apparatus for reducing the concentration of a first substance in a first liquid by subjecting the first liquid to natural osmosis, via a first semipermeable body, with respect to an intermediate liquid, which intermediate liquid is a solution or suspension of a second substance in a second liquid, the second liquid being the same as the first liquid and passing through the first semipermeable body, the second substance being of larger molecular size than the first substance and not passing through the first semi-permeable body, whereby the quantity of the second liquid in the intermediate liquid is increased, and then subjecting the intermediate liquid to reverse osmosis under pressure via a second semipermeable body to pass therethrough the second liquid.

U.S. Pat. No. 7,901,577 discloses that desalination is carried out by a hybrid ion exchange-nanofiltration process in which ion exchange is followed by pressure-driven nanofiltration. Monovalent ions of sodium and chloride of saline water are exchanged for equivalent concentrations of polyvalent ions (for example, sodium ions for magnesium ions or chloride ions for sulfate ions) when passed through ion exchangers in the form of those poly-valent ions. The resultant solution has a lower osmotic pressure than the initial solution containing monovalent sodium and chloride ions, and requires less transmembrane pressure for membrane desalination compared to traditional reverse osmosis. The concentrated reject stream from the membrane process is used as regenerant for the exhausted ion exchanger, which has been converted to monovalent anionic or cationic form.

WO 2011/059751 discloses separation processes using engineered osmosis generally involving the extraction of solvent from a first solution to concentrate solute by using a second concentrated solution to draw the solvent from the first solution across a semi-permeable membrane. Enhanced efficiency may result from using low grade waste heat from industrial or commercial sources.

WO 2010/067063 discloses a process for separating solvent from a solution, said process comprising passing the solution through a selective membrane under reverse osmosis conditions to separate solvent from the solution, or separating solvent from the solution by thermal methods to produce a residual solution having an increased solute concentration, and intermittently passing at least a portion of the solution on the retentate-side of the selective membrane and/or at least a portion of the residual solution through a nanofiltration membrane to separate further solvent from the portion of solution.

However, it is still difficult to efficiently purify fluid with reasonable energy consumption.

It is an object of the invention to provide a robust and reliable system to efficiently purify fluid with reasonable energy consumption.

In order to achieve the object defined above, an apparatus for and a method of purifying fluid according to the independent claims are provided.

According to an exemplary embodiment of the invention, an apparatus for purifying fluid is provided which comprises an osmosis unit configured for pre-purifying the fluid, which is to be purified, (hence also denoted as "fluid to be purified") by forward osmosis (in particular by an osmotic diffusion), also denoted as positive osmosis or direct osmosis, of the fluid to be purified through an osmosis membrane (i.e. any membrane suitable for, capable of or specifically configured for supporting the phenomenon of osmosis) into a chamber comprising dissolved first ions (in particular first cations and first anions) as a draw solution, wherein the osmotic diffusion may result in a decrease of the ion concentration in the draw solution or a dilution, an ion exchange unit configured for exchanging at least part of the first ions (in particular at least part of the first cations and/or the first anions) by second ions (in particular second cations and/or second anions), and a re-concentration unit configured for separating the pre-purified fluid after the ion exchange into purified fluid (which may also be denoted as permeate or product fluid) and into a re-concentrate (which may also be denoted as retentate) enriched with the respective ions (in particular anions and cations).

According to another exemplary embodiment of the invention, a method of purifying fluid is provided which comprises pre-purifying the fluid to be purified by forward osmosis of the fluid to be purified through an osmosis membrane into a chamber comprising dissolved first ions (in particular first cations and first anions), subsequently exchanging at least part of the first ions (in particular at least part of at least one of the first cations and the first anions) by second ions (in particular at least one of second cations and second anions) by an ion exchanger, and separating the pre-purified fluid after the exchanging into purified fluid and into a re-concentrate enriched with the respective ions (in particular anions and cations).

In the context of the present application, the term "fluid" may particularly denote a liquid and/or a gaseous medium, optionally comprising solid particles.

In the context of the present application, the term "forward osmosis" may particularly denote an osmotic process that uses a semi-permeable membrane to effect separation of a fluid (such as water) from dissolved solutes and/or other contaminants. The driving force for this separation is an osmotic pressure gradient, such that a draw solution of high concentration (relative to that of the feed solution), is used to induce a net flow of the fluid through the membrane into the draw solution, thus effectively separating the feed fluid (i.e. the fluid to be purified) from its solutes and other contaminants. In contrast to forward osmosis, the completely different process of reverse osmosis uses hydraulic pressure as the driving force for separation, which serves to counteract the osmotic pressure gradient that would otherwise favor fluid flow from a permeate to a feed.

In the context of the present application, the term "ion exchange" may particularly denote an exchange of ions (i.e. cations and/or anions) between two electrolytes or between an electrolyte solution and a complex (such as an ion exchange matrix, which may comprise resin, gel, etc.). The term may be used to denote the processes of purification, separation, and decontamination of aqueous and other ion-containing solutions with ion exchangers such as solid polymeric or mineralic ion exchangers, or any other kind of ion exchangers.

According to an exemplary embodiment of the invention, the procedures of forward osmosis, ion exchanging and re-concentration are synergetically combined in terms of fluid purification and are integrated in the framework of a preferably reversible operating, preferably closed cycle processing system. In particular, a concentration gradient in combination with a forward osmosis membrane may be used as a purifying mechanism. The combination with ion exchange and re-concentration allows to efficiently recover a draw solution used for forward osmosis and to complete the purification. Such a robust and reliable processing system has the advantage of a significant reduction of the energy consumption (inter alia, the high energy consumption of the time-consuming and cumbersome pre-treatment of the raw fluid, as required by conventional reverse osmosis, is dispensable according to an exemplary embodiment of the invention; beyond this, exemplary embodiments of the invention may also produce or recover energy during the process of fluid purification, which may further improve the energy efficiency of the apparatus). The only noteworthy net energy consumption of such a system may occur in the re-concentration unit (for instance when using a nanofiltration membrane, a pressure (of for instance 20 bar or 40 bar or any other appropriate pressure value) has to be generated there). By forward osmosis, the fluid is pre-purified (preferably, but not necessarily in a substantially pressureless process (i.e. without the need to supply substantial external pressure)) by allowing fluid, but not contaminants thereof, to pass any desired osmosis membrane capable of or suitable for supporting the phenomenon of osmosis due to a concentration difference of cations and anions in the fluid to be purified (low ion concentration) on one side of the osmosis membrane and in a draw solution (high ion concentration) on the opposing other side of the osmosis membrane. When configuring the osmosis membrane so that the cations and anions are substantially unable to pass the membrane for size reasons and/or charge reason, the only possible concentration equilibration procedure is diffusion of the fluid to be purified (but not of its contaminants) from the raw fluid via the membrane towards a chamber accommodating the draw solution with the high concentration of cations and anions. Subsequently, the mixture of the pre-purified fluid and the ions (i.e. cations and anions) may be made subject of an ion exchange in which the ions of the mixture are exchanged by other ions. After this ion exchange has been completed, the fluid including the other ions can be re-concentrated by separating a first portion (for example, but not necessarily, a main portion) of the fluid from the exchanged ions dissolved in a second portion (for example, but not necessarily, a smaller portion) of the fluid. After this re-concentration, the first portion of the fluid constitutes the purified fluid (which may or may not be subsequently made subject to further purification, if desired), whereas the second portion of the fluid with the exchanged ions can be further processed to establish a closed cycle procedure. For this purpose, the exchanged ions can be substituted again by the previously mentioned original ions in a further ion exchange procedure (which can preferably be accomplished within the same ion exchange unit which has already been used for the previously mentioned ion exchange procedure, thereby regenerating the ion exchange unit) so that the resulting fluid with the recovered original ions can be used again as draw solution for the next batch of fluid to be purified.

In the following, further exemplary embodiments of the apparatus and the method will be explained.

In an embodiment, the ion exchange unit is composed of two separate ion exchange elements (such as columns), wherein a first ion exchange element accomplishes exchange of cations (for instance $Na^+ \rightarrow Mg^{2+}$), and a second ion exchange element accomplishes exchange of anions (for instance $Cl^- \rightarrow SO_4^{2-}$). Other configurations are possible as well.

In an embodiment, the above described forward osmosis can be supported additionally by pressure-assisted osmosis. In such an embodiment, an additional pressure may be applied to the fluid to be purified so as to further promote the flow and increase the flow rate through the osmosis membrane. By taking this measure, throughput may be further increased.

In an embodiment, the osmosis unit is configured for promoting a flow of the fluid to be purified through the osmosis membrane while inhibiting a flow of contaminants from the fluid to be purified towards the chamber (accommodating the draw solution) and while inhibiting the first ions (in particular the first cations and the first anions) as well as other impurities (suspended or in solution) from flowing through the osmosis membrane towards the fluid to be purified. This can be accomplished by correspondingly configuring the size of pores of the osmosis membrane. Additionally or alternatively, osmosis may also depend on the charge state of the particles and the osmosis membrane (as known by those skilled in the art as Coulomb's Law in addition to Donnan Exclusion Effect).

In an embodiment, the ion exchange unit is configured for exchanging at least part of the first anions by the second anions and/or at least part of the first cations by the second cations. For instance, it is possible that only the cations are exchanged. Alternatively, it is also possible that only the anions are exchanged. Also an exchange of both cations and anions is possible. The first anions and the first cations may be selected specifically so as to obtain a high efficiency of drawing pure fluid through the osmosis membrane. By substituting both the first anions by the second anions and the first cations by the second cations, it is possible to combine these advantages with the further advantage that the second anions and the second cations may be selected specifically so as to obtain an efficient re-concentration in the re-concentration unit.

In an embodiment, the ion exchange unit is configured for reversibly exchanging at least part of the ions (in particular at least part of the anions and/or at least part of the cations)

prior to re-concentration and after re-concentration. As an example, such a reversible ion exchange may mean that a first ion exchange procedure (for instance 2 Cl⁻→$SO_4^{2-}$ and/or 2 Na⁺→$Mg^{2+}$) occurs in a forward fluid flow direction from the osmosis unit towards the re-concentration unit, and that an inverse second ion exchange procedure (for instance $SO_4^{2-}$→2 Cl⁻ and/or $Mg^{2+}$→2 Na⁺) occurs in a backward fluid flow direction from the re-concentration unit back to the osmosis unit. This allows to integrate the fluid purification process into a closed cycle procedure and keeps the amount of waste small.

According to an exemplary embodiment of the invention, the ion exchange in backward direction and the ion exchange in forward direction may be carried out in one and the same ion exchange unit. Alternatively, two separate ion exchange units may be implemented, one for the ion exchange in forward direction, and the other one for the ion exchange in backward direction. Ion exchange in backward direction may also function for regeneration of the ion exchange unit after the ion exchange in forward direction, and vice versa.

In an embodiment, the ion exchange unit is configured for exchanging back at least part of the ions (in particular at least part of the anions and/or at least part of the cations) after the ion exchanging by the respectively other ions (in particular anions and cations) by an ion exchange after re-concentration. The further ion exchange is accomplished between ions of the re-concentrate or retentate (which for instance does not pass a re-concentration membrane or the like, is separated by a thermal processing, etc.) and the respectively other anions and/or cations which have been exchanged in the pre-purified fluid upstream of the re-concentration unit.

In an embodiment, the re-concentration unit is configured for filtering the pre-purified fluid after the ion exchange by a re-concentration membrane so that the purified fluid passes the re-concentration membrane, whereas at least part of the ion exchanged ions (in particular anions and cations) are retained by the re-concentration membrane and are therefore re-concentrated. For example, such a re-concentration membrane may be a nano-filtration membrane, an ultrafiltration membrane, a micro-filtration membrane and/or a reverse osmosis membrane. However, other types of membranes are possible as well. By accomplishing the re-concentration by a re-concentration membrane, the energy consumption may be kept very low.

Additionally or alternatively to the provision of a re-concentration membrane, the re-concentration unit may be configured for accomplishing the re-concentrating by a thermal treatment of the fluid. For example, the thermal treatment may be selected from a group consisting of multi-stage flashing, multi-effect distillation, and solar distillation.

Additionally or alternatively to the provision of a re-concentration membrane and/or a thermal treatment for re-concentrating, the re-concentration unit may be configured for accomplishing the re-concentrating by at least one of the group consisting of membrane distillation, vapor compression desalination, freezing treatment, electric dialysis, and Ionenkraft ("ion force", as implemented by Saltworks Technologies) processing.

In an embodiment, the apparatus comprises a fluid drive unit for driving the pre-purified fluid flowing from the ion exchange unit towards the re-concentration unit. Such a fluid drive unit may be a pump providing a (or an additional) pumping force for conveying the pre-purified fluid to the re-concentration unit and to build up sufficient pressure.

In an embodiment, at least part of the first cations and/or at least part of the first anions have an absolute value of a charge state in solution which is lower than an absolute value of a charge state of at least part of the second cations and/or at least part of the second anions in solution. More particularly, at least one of the first cations and the first anions may be monovalent cations or anions, and at least one of the second cations and the second anions may be multivalent (in particular bivalent) cations or anions. With such a configuration, the number of particles can be reduced during the forward (i.e. in a direction from the osmosis unit towards the re-concentration unit) ion exchange which has a positive impact on the efficiency of re-concentration. Apart from this, deposition may also be simplified by a higher charge state when a surface charging of the membrane (zeta potential of the membrane) repels the correspondingly charged particles, and the inversely charged counter ions are retained by the Donnan exclusion effect.

Additionally or alternatively, the first cations are smaller than the second cations and/or the first anions are smaller than the second anions. Therefore, the re-concentration membrane of the re-concentration unit can be provided with larger pores, thereby increasing the efficiency of the recovery of purified fluid at the re-concentration unit without the danger that a relevant number of the (relatively large) ions unintentionally passes the re-concentration membrane.

Additionally or alternatively, the exchanged second ions may have a better capability of being thermally deposited than the first ions (for example $H_2SO_3$ in water, which dissolves in liquid into H⁺ and $HSO_3^-$). More generally, the ion exchange may be adjusted so that it improves the re-concentration procedure, for instance renders the latter more efficient.

In an embodiment, the first anions (Cl⁻) and the first cations (Na⁺) represent dissolved sodium chloride (NaCl). Sodium chloride has advantageous properties/behaviour promoting forward osmosis. Sodium chloride comprises monovalent cations and monovalent anions. Additionally or alternatively, the second anions ($SO_4^{2-}$) and the second cations ($Mg^{2+}$) may represent dissolved magnesium sulphate ($MgSO_4$). When substituting 2 Cl⁻→$SO_4^{2-}$ and 2 Na⁺→$Mg^{2+}$, the number of particles as relevant parameter for (at least membrane-based) re-concentration can be advantageously reduced. This reduces the osmotic pressure and therefore reduces the energy consumption, in particular for re-concentration. Both sodium chloride (NaCl) and magnesium sulphate ($MgSO_4$) are nonhazardous, cheap and easily available materials. However, as an alternative to the combination of sodium chloride and magnesium sulphate, any other combination of salts/ionic compounds (for instance LiCl instead of NaCl) may be used in other exemplary embodiments.

In an embodiment, the apparatus comprises an energy production unit configured for producing energy during operating the apparatus, in particular from an osmosis-based pressure level in the osmosis unit. When the pressure level of fluid in the draw solution chamber is increased due to forward osmosis, the potential energy or elevation energy involved in this increase of the pressure level may for instance be used for powering a turbine with energy of the fluid flowing downwardly again. For example, an energy production procedure which may be involved in an exemplary embodiment of the invention is pressure retarded osmosis.

In an embodiment, the energy production unit is configured for supplying at least part of the produced energy for operating the apparatus. Therefore, at least a part of the energy consumption of the apparatus may be contributed by energy produced during the fluid purification process. This further reduces the net energy consumption of the apparatus during operation.

In an embodiment, the apparatus comprises a pressure exchange unit (which may function as an energy recovery unit) configured for transmitting pressure between (in particular from) fluid propagating from the re-concentration unit to the ion exchange unit and (in particular to) fluid propagating from the ion exchange unit to the re-concentration unit. In particular, high pressure of fluid coming from the re-concentration unit can be transferred to low pressurized fluid flowing towards the re-concentration unit. Such a pressure exchange unit, an example of which being shown in FIG. 2, may transfer pressure between downstreaming and upstreaming fluid with a high degree of efficiency. Other processes of energy recovery can be implemented as well, for instance implementing a turbine, a Pearson pump (like the ones built by Spectra Watermakers), etc.

In an embodiment, the apparatus is configured as a closed cycle system in which the anions and the cations are recovered and reused within a closed cycle. That renders the fluid purification system particularly efficient and reduces the amount of waste.

In an embodiment, the apparatus is configured as at least one of the group consisting of a desalinisation plant (such as a seawater desalinisation plant or a brackwater desalinisation plant), a portable (in particular backpack-based) apparatus for mobile water purification, a domestic water purification apparatus for purifying water for a building, an industrial water purification apparatus for purifying water for a plant, an agricultural water purification apparatus, and a mining water purification apparatus. However, other applications are possible as well. In particular, the apparatus may be used for substantially any wastewater recycling and reclamation purpose, in particular for public water supply and waste disposal (for instance in the municipal sector).

The aspects defined above and further aspects of the invention are apparent from the examples of embodiment to be described hereinafter and are explained with reference to these examples of embodiment.

The invention will be described in more detail hereinafter with reference to examples of embodiment but to which the invention is not limited.

The illustrations in the drawings are schematic. In different drawings, similar or identical elements are provided with the same reference signs.

Before describing the figures in further detail, some basic considerations will be summarized based on which exemplary embodiments have been developed.

Exemplary embodiments of the invention may involve one or more of the following concepts:

Forward osmosis can be used as a procedure for water purification (in particular for water treatment or water desalinisation). In a corresponding system, it is possible, but not necessary that the fluid to be purified by forward osmosis is pre-treated or pre-processed.

Reversible ion exchanging can be implemented in order to reduce the osmotic pressure of a draw solution for a membrane-based re-concentration. For example, the ion exchange may exchange NaCl into $MgSO_4$. However, many other combinations of materials are possible which can be exchanged by reversible ion exchange, in order to obtain an advantage for subsequent re-concentration.

A re-concentration stage (preferably, but not necessarily, membrane-based and/or thermally based) may be implemented.

Figure 1:
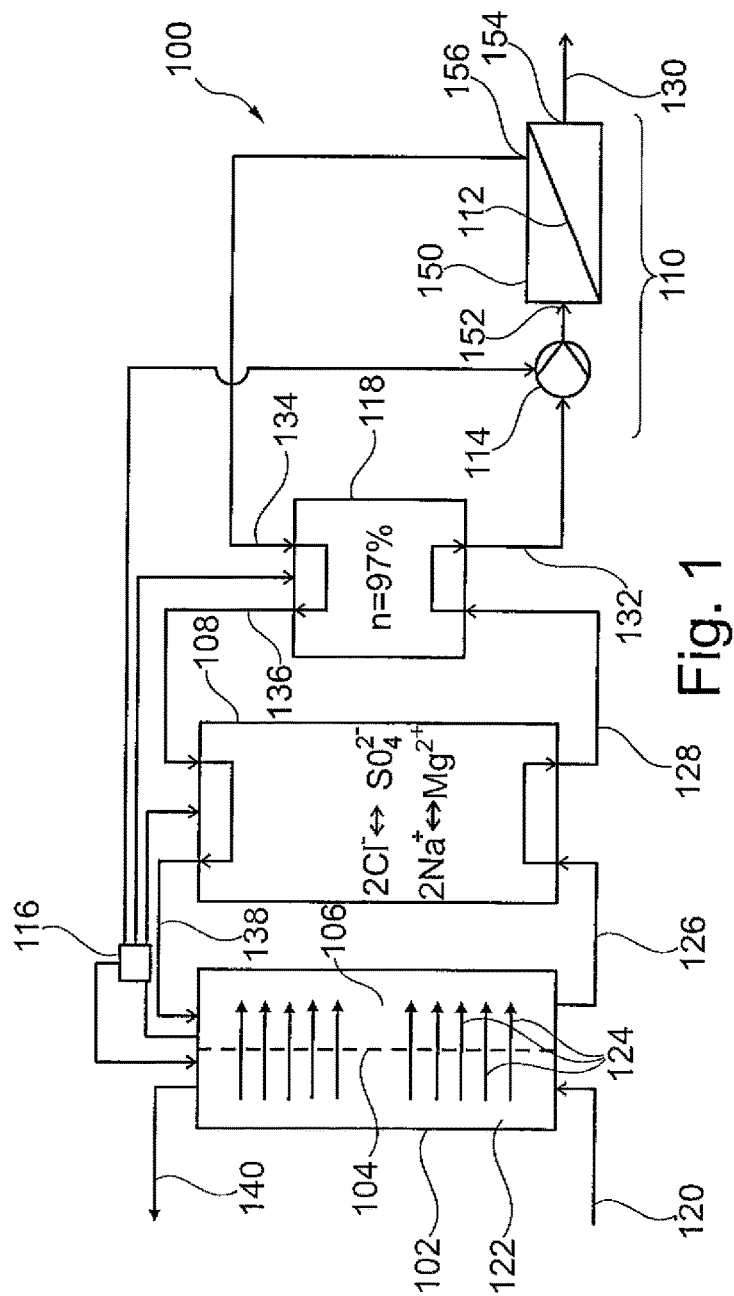
FIG. 1 illustrates a schematic view of an apparatus for purifying fluid according to an exemplary embodiment of the invention.

Optionally, an energy recovery mechanism may be integrated in the fluid purification process (see reference numeral 118 in FIG. 1).

Optimally, an energy production mechanism may be integrated in the fluid purification process (see reference numeral 116 in FIG. 1).

According to an exemplary embodiment of the invention, an osmotic water treatment is provided which can be used, for example, for drink water treatment, wastewater treatment, seawater desalinisation (including brackwater desalinisation), etc. with high throughput and low energy consumption. Exemplary embodiments may be applied in communal and industrial water supply and waste water management, in mining, in agriculture, in the military sector, in the navy, and for food processing. Also aircraft and spacecraft applications are possible according to exemplary embodiments of the invention.

Advantages of a system according to an exemplary embodiment of the invention are the high energy efficiency and its high robustness. Operation of such a system is simple and involves only a small effort in terms of required skills of operators (which renders the system particularly appropriate for low developed regions) and maintenance (which renders the system appropriate for difficult applications).

The amount of chemicals required for the process is very small, which reduces costs and pollution, and relaxes the logistic effort. In view of the small sufficient pressure values involved in the process, simple and cost efficient components may be implemented in the system. Small pressure values can be obtained by using ion exchange against multivalent ions, thereby reducing, in turn, the osmotic pressure of the draw solution. As a result, pressure tubes can be made of plastic rather than of steel. It is sufficient to implement simple valves and pumps, etc. As compared to thermal purification systems, the system for purifying fluid according to an exemplary embodiment of the invention can be implemented at any desired location, since it is independent of any economic heat source (such as heat dissipated by a power plant).

A functional principle involved in an exemplary embodiment of the invention is the physical phenomenon of forward osmosis according to which the solutions being separated from one another by a semipermeable membrane equilibrate their concentrations.

Without a separating membrane, the dissolved particles would be equally distributed in the entire volume of both sides of the chamber (under the influence of mixing entropy). By intentionally preventing this thanks to the provision of an osmosis membrane dimensioned to enable only the fluid to be purified (in particular water) to pass the membrane, but to disable this for both the contaminants and the ions, the only possibility of an equilibration is a dilution of the higher concentrated draw solution until the concentration difference is equilibrated or the hydrostatic pressure of the fluid column on the side of the diluted solution balances out the osmotic pressure. For this purpose, a draw solution is provided in the chamber on the side of the osmosis membrane opposing the fluid to be purified. This draw solution shall have an ion concentration being higher than the solution of the fluid to be filtered or purified (i.e. the raw fluid). Highly advantageously, the draw solution may be re-concentrated after each cycle, thereby separating the obtained pure fluid or product fluid. This allows to obtain synergistically purified fluid and a re-concentration of the osmotic agent (i.e. the osmotically active dissolved matter in the draw solution). By such a substantially loss-free recycling of the draw solution, a closed cycle process can be obtained.

A corresponding system will be described in the following in further detail referring to FIG. 1:

FIG. 1 illustrates a schematic view of an apparatus 100 for purifying fluid according to an exemplary embodiment of the invention. The fluid to be purified flows from a fluid source 120 into an accommodation space 122 on the left-hand side of an osmotic membrane 104.

The apparatus 100 comprises an osmosis unit 102 configured for pre-purifying the fluid to be purified by forward osmosis of the fluid to be purified through the osmosis membrane 104 into a chamber 106 comprising, as draw solution, dissolved first cations (in the shown embodiment $Na^+$) and first anions (in the shown embodiment $Cl^-$) of a first dissolved salt (sodium chloride, NaCl, in the shown embodiment). The osmosis membrane 104 is a semipermeable membrane which is configured (in particular in terms of pore size or zeta potential) so that it can be passed by water as the fluid to be purified, whereas the semipermeable membrane is configured so that it cannot be passed by contaminants in raw fluid to be purified and cannot be passed by the first cations and the first anions of the draw solution. The first cations and the first anions which are dissolved in a liquid carrier such as water are located in the chamber 106 prior to the start of a fluid purification process. For instance in the scenario of seawater desalinisation, the raw fluid may be seawater with contaminants and may also include dissolved sodium chloride, i.e. may also comprise a certain concentration of the first cations ($Na^+$) and the first anions ($Cl^-$). However, the concentration of the ions (i.e. cations and anions) shall be larger in the chamber 106 (for instance 5% or more) as compared to their concentrations in the raw fluid (for instance 3% or less). The forward osmosis unit 102 is configured for promoting, driven by the phenomenon of forward osmosis, a flow of the fluid to be purified through the osmosis membrane 104 while inhibiting a flow of contaminants from the fluid to be purified towards the chamber 106 and while inhibiting the first cations and the first anions from flowing through the osmosis membrane 104 towards the fluid to be purified. This draws pure water through the osmosis membrane 104, as indicated by arrows 124, while forcing the contaminants of the raw fluid (which may also be denoted as feed solution, feed water or feed fluid) to remain within the accommodation space 122.

As indicated by reference numeral 126, the so processed pre-purified fluid together with dissolved sodium chloride ($Na^+$, $Cl^-$) flows into an ion exchange unit 108. The ion exchange unit 108 is configured for exchanging the first cations ($Na^+$) by second cations ($Mg^2$) and for exchanging the first anions ($Cl^-$) by second anions ($SO_4^{2-}$). Hence, this ion exchange exchanges monovalent small ions by bivalent larger ions which has a pronounced positive impact on the osmotic pressure (more precisely, advantageously reduces the latter), therefore improving the below described re-concentration efficiency. A skilled person will understand that other ions and/or other valent ratios are possible.

Figure 2:
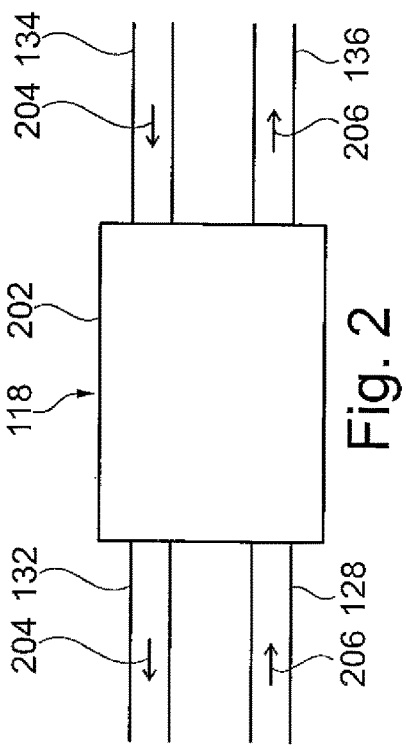
FIG. 2 illustrates a pressure exchange unit of an apparatus according to an exemplary embodiment of the invention.

After this primary ion exchange, the ion exchanged pre-purified fluid is forwarded, via a pressure exchange unit 118, to a re-concentration unit 110, as indicated by reference numerals 128, 132. The pressure exchange unit 118, shown in detail in FIG. 2, is configured for transmitting pressure between two opposing fluid flows between the ion exchange unit 108 and the re-concentration unit 110 and functions as an isobaric energy recovery component.

The apparatus 100 furthermore comprises a fluid drive unit 114 such as a pump for increasing pressure of the pre-purified fluid flowing from the ion exchange unit 108 towards the re-concentration unit 110.

According to an exemplary embodiment of the invention, the pressure exchange unit 118 and the fluid drive unit 114 can be integrally formed as one common entity, i.e. a pump with integrated energy recovery function fulfilling both tasks of pressure exchange between the fluid flowing upstream and downstream, as well as driving fluid in the upstream direction (such as a Clark pump or a Pearson pump, as manufactured by Spectra Watermakers).

The re-concentration unit 110 is configured for separating the pre-purified fluid after the ion exchange into purified fluid (which may also be denoted as permeate or product water or product fluid) and into a re-concentrate (which may also be denoted as retentate) enriched with the respective second cations ($Mg^{2+}$) and second anions ($SO_4^{2-}$). The re-concentration is accomplished by filtering the pre-purified fluid after the ion exchange by a re-concentration membrane 112 (and/or thermally), such as a nanofiltration membrane, of the re-concentration unit 110 so that the purified fluid passes the re-concentration membrane 112 and can be conveyed to a destination 130, such as an end user consuming the purified water.

Another part of the fluid including a high concentration of the second cations ($Mg^{2+}$) and second anions ($SO_4^{2-}$) is retained by the re-concentration membrane 112. This other part of the fluid including the high concentration of the second cations and second anions retained by the re-concentration membrane 112 is then conducted back via the pressure exchange unit 118 towards the ion exchange unit 108, the reference numerals 134, 136. Subsequently, the same ion exchange unit 108 as mentioned above exchanges back the second anions by the first anions ($SO_4^{2-} \rightarrow 2\ Cl^-$) and the second cations by the first cations ($Mg^{2+} \rightarrow 2\ Na^+$) in a further ion exchange procedure after the described re-concentration. Hence, the ion exchange unit 108 is highly advantageously configured for reversibly exchanging the ions prior to re-concentration and after re-concentration. Thus, the apparatus 100 operates as a closed cycle system in which the anions and the cations are continuously and repeatedly recovered and reused within a closed cycle without the need to supply new draw solution to the system for each batch of water to be purified.

As indicated by reference numeral 138, the recovered draw solution is then conducted back into the chamber 106, where it can be used for purifying new water to be purified and being delivered from the fluid source 120.

Contaminant enriched fluid which has been supplied into the accommodation volume 122 and which has been unable to pass the osmosis membrane 104 is forwarded to a drain 140 such as a wastewater disposal. It is also possible that the contaminant enriched fluid is introduced into a new purification cycle.

Optionally, an energy generation unit 116 may be provided which is configured for generating energy from an osmosis-based rising pressure level in the osmosis unit 102 (more specifically on the draw solution side). Simplified, one might say that a corresponding pressure increase in the draw solution contains energy which can be used. Reference is made to U.S. Pat. No. 3,906,250. As indicated schematically by various arrows in FIG. 1, the energy generation unit 116 is configured for supplying the generated energy for operating one or more of the various components of the apparatus 100.

In the following, the operation of the apparatus 100 be described in further detail:

Purified water is drawn, in the osmosis unit 102, from the contaminated raw water side (left hand side of the osmosis membrane 104 according to FIG. 1) onto the draw solution side (right hand side of the osmosis membrane 104 according to FIG. 1), and thereby dilutes the draw solution in the chamber 106.

Optionally, this procedure can be simultaneously combined with a pressure retarded osmosis in order to produce energy. For example, this energy may be used in order to supply operation energy to one or more components of the apparatus 100.

The diluted draw solution obtained in chamber 106 after the forward osmosis then flows through the ion exchange unit 108. During a corresponding ion exchange procedure, the small and monovalent ions ($Na^+$, $Cl^-$) of the draw solution are substituted by larger and bivalent (or more generally multivalent, for instance trivalent) ions ($Mg^{2+}$, $SO_4^{2-}$). As a result, the osmotic pressure of the draw solution is significantly reduced. In the example of the ions according to FIG. 1, two Nat ions can bind to one $SO_4^{2-}$ ion, and two $Cl^-$ ions may bind to one $Mg^{2+}$ ion, which allows to reduce the number of dissolved particles by a factor of two, which may consequently reduce the osmotic pressure by a factor of two.

In a subsequent membrane-based re-concentration this results in a high reduction of the needed hydraulic pressure and therefore the energy consumption. When implementing other re-concentration units 110 (i.e. other than membrane-based re-concentration units 110), the configuration of the ion exchange unit 108 may be adapted to obtain corresponding advantages which do not relate to a reduction of the osmotic pressure. An example, for thermally-based re-concentration, would be an exchange against ions which can be deposited thermally at a lower temperature than the ions used in the osmosis unit 102. A corresponding example would be $CO_2$—$NH_3$.

An embodiment of the invention, in which the ion exchange is reversible, is highly preferred although not mandatory.

Next, the ion exchanged solution flows through the pressure exchange unit 118. The pressure exchange unit 118 transfers a (preferably large, for example more than 50%) percentage (for instance 97%) of pressure of a fluidic flow of concentrate (flowing from the re-concentration unit 110 back to the ion exchange unit 108) to the diluted draw solution (flowing from the ion exchange unit 108 towards the re-concentration unit 110).

The forwardly flowing pre-purified water then passes the fluid drive unit 114 which may be a boost pump for providing a desired or required remaining pressure (i.e. a difference between a required pressure and a pressure of the forwardly flowing pre-purified water downstream of the pressure exchange unit 118).

Subsequently, the forwardly flowing pre-purified water flows towards the re-concentration membrane 112. A further chamber 150 in which the re-concentration membrane 112 is located and in which the forwardly flowing pre-purified water flows via a fluid inlet 152, has two fluid outlets 154, 156.

The permeate, i.e. the pure water and therefore the final product, flows towards the destination 130 via outlet 154.

The concentrate (or retentate) however flows back via outlet 156 to the pressure exchange unit 118 and transfers still present pressure with low loss to diluted draw solution flowing from the ion exchange unit 108 to the re-concentration unit 110, in order to pre-load the latter, in terms of pressure, for the re-concentration unit 110. It is also possible that pressure is used for powering a turbine for generating electric current, is supplied to a booster, etc.

After having left the pressure exchange unit 118, the concentrate flows, preferably but not mandatory in counter direction with respect to the flowing direction of the diluted draw solution, a second time through the reversibly operating ion exchange unit 108 and exchanges the divalent ions ($Mg^{2+}$, $SO_4^{2-}$) with the original monovalent ions ($Na^+$, $Cl^-$). This increases (for instance doubles) the osmotic pressure in the draw solution.

Finally, the concentrate flows back into the osmosis unit 102, and the cycle commences again from the beginning.

Next, the individual procedural steps and components of the apparatus 100 will be described in further detail.

Within the osmosis unit 102, any configuration is possible which is based on the principle of forward osmosis, i.e. in which a higher concentrated solution extracts a solvent such as water from a lower concentrated solution. This can be accomplished by an artificially prepared draw solution (as in FIG. 1), whereas it is however also possible to implement osmotic dilution or osmotic energy recovery or the like. However, osmosis shall be combined with a (preferably reversible) ion exchange and a subsequent re-concentration. It is for instance possible to dilute fluid to be purified (such as the water) with auxiliary fluid (such as sewage or wastewater) having a lower osmotic pressure, so that the purification (for instance desalinisation) of the mixture of the actual fluid to be purified and the auxiliary fluid can then be accomplished with lower concentrated fluid.

What concerns the (preferably reversible) ion exchange as carried out in the ion exchange unit 108, it is advantageous to operate the ion exchange without external or separate regeneration solution by conducting the solution produced in the re-concentration unit 110 (if desired after a concentration procedure) a second time through the ion exchange unit 108 (preferably but not mandatory in opposite direction with regard to the initial flow direction). Advantageously, the apparatus 100 may, in each cycle, supply artificially produced clean diluted draw solution with predefined, reproducible and always identical composition to the ion exchange unit 108.

For regenerating or re-concentrating the draw solution, the re-concentration membrane 112 may be implemented which retains the dissolved ions in the re-concentration unit 110 by filtering, so that the ions are available for a regeneration of the reversible ion exchange procedure. For example, one of the following membrane separation procedures may be carried out in this context: nanofiltration, reverse osmosis (for instance adapted as seawater reverse osmosis, or brackwater reverse osmosis), ultrafiltration, microfiltration, etc.

However, it is also possible to implement, for re-concentration, a thermal process which may involve distillation. For instance, multi stage flash evaporation, multi effect distillation and/or solar distillation may be applied. Further alternatively, the re-concentration may be accomplished by membrane distillation, vapor compression desalination, freezing procedures, electro dialysis, or Ionenkraft methods. For the case of such non-membrane-based re-concentration procedures, the ion exchange in the ion exchange unit 108 can then exchange an osmotic agent against ions which have a positive impact on the subsequent re-concentration. For the example of thermal re-concentration, primary ions may be exchanged by secondary ions which can be deposited at lower temperature.

As mentioned above, an energy recovery procedure can be optionally involved in the process of purifying fluid. Examples for such an energy recovery are an isobaric energy recovery (for instance in the form of the pressure exchange unit 118), a turbine for generating electric current, a turbocharger, a pump (which may preferably substitute the fluid drive unit 114) with integrated energy recovery function (such as a Pearson pump or a Clark pump, as manufactured by Spectra Watermakers).

FIG. 2 illustrates a pressure exchange unit 118 of an apparatus 100 according to an exemplary embodiment of the invention.

The functioning principle of the pressure exchange unit 118 as an example for an energy recovery component according to an exemplary embodiment of the invention is as follows: The flow of concentrate flows through the pressure exchange unit 118 and leaves the latter with a certain amount (for instance approximately 95%) of the required inlet pressure of the re-concentration unit 110 (in the previous cycle, the concentrate has left the re-concentration unit 110 with for instance around 98% of the inlet pressure, and the pressure exchange unit 118 may have a degree of efficiency of 97%).

The pressure exchange unit 118 shown in FIG. 1 and FIG. 2 is an isobaric energy transfer component which transfers hydraulic pressure from one fluid stream onto another fluid stream. Such a procedure can be carried out with a significantly larger degree of efficiency as if a conversion of the type of energy was required.

As can be taken from FIG. 2, a pressure exchange is accomplished between primary fluid flowing from the ion exchange unit 108 towards the re-concentration unit 110 (see reference numerals 128, 132) and secondary fluid flowing from the re-concentration unit 110 towards the ion exchange unit 108 (see reference numerals 134, 136). A rotating piston (not shown) is arranged within a casing 202 (such as a cylinder). Arrows 204 indicate the respective fluid under pressure, whereas arrows 206 indicates the respective fluid in a pressureless or low pressure state.

In an embodiment in which no energy recovery shall be implemented, it is advantageous to implement a back pressure valve (optionally in combination with a pressure relief valve), in particular when a membrane based re-concentration unit 110 shall be implemented in the apparatus 100.

As alternative to the configuration according to FIG. 2, it is for instance possible to implement a turbine, a booster, a Pearson pump and/or a Clark pump (for instance as manufactured by Spectra Watermakers).

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Implementation of the invention is not limited to the preferred embodiments shown in the figures and described above. Instead, a multiplicity of variants are possible which use the solutions shown and the principle according to the invention even in the case of fundamentally different embodiments.

The invention claimed is:

1. An apparatus for purifying fluid, the apparatus comprising:
    an osmosis unit for pre-purifying the fluid to be purified by forward osmosis of the fluid to be purified through an osmosis membrane into a chamber comprising dissolved first ions;
    an ion exchange unit for exchanging at least part of the first ions by second ions;
    a re-concentration unit for separating the pre-purified fluid after the ion exchange into purified fluid and into a re-concentrate enriched with the respective ions,
    wherein at least part of the first ions have an absolute value of a charge state in solution which is lower than an absolute value of a charge state of at least part of the second ions in solution.

2. The apparatus according to claim 1, wherein the osmosis unit promotes a flow of the fluid to be purified through the osmosis membrane while inhibiting a flow of contaminants from the fluid to be purified towards the chamber and while inhibiting the first ions from flowing through the osmosis membrane towards the fluid to be purified.

3. The apparatus according to claim 1, wherein the first ions comprise first cations and first anions and the second ions comprise second cations and second anions, and wherein the ion exchange unit exchanges at least part of the first anions by the second anions and/or at least part of the first cations by the second cations.

4. The apparatus according to claim 1, wherein the ion exchange unit reversibly exchanges at least part of the ions prior to re-concentration and after re-concentration.

5. The apparatus according to claim 1, wherein the ion exchange unit exchanges back at least part of the ions after the ion exchanging by the respectively other ions by a further reverse ion exchange after re-concentration.

6. The apparatus according to claim 1, wherein the re-concentration unit filters the pre-purified fluid after the ion exchange by a re-concentration membrane so that the purified fluid passes the re-concentration membrane, whereas at least part of the ion exchanged ions are retained by the re-concentration membrane.

7. The apparatus according to claim 6, wherein the re-concentration unit comprises at least one of the group consisting of a nano-filtration membrane, an ultra-filtration membrane, a micro-filtration membrane, and a reverse osmosis membrane.

8. The apparatus according to claim 1, wherein the re-concentration unit re-concentrates by a thermal treatment of the fluid.

9. The apparatus according to claim 1, comprising at least one of the following features:
    wherein the re-concentration unit re-concentrates by at least one of the group consisting of membrane distillation, vapor compression desalination, freezing treatment, electric dialysis, and Ionenkraft processing;
    comprising a fluid drive unit for providing or enhancing a driving force acting on the pre-purified fluid flowing from the ion exchange unit towards the re-concentration unit;
    wherein the first cations and the second cations are selected in terms of ion properties so as to increase efficiency of re-concentration in the re-concentration unit.

10. The apparatus according to claim 1, comprising an energy production unit for producing energy during operating the apparatus.

11. The apparatus according to claim 10, wherein the energy production unit supplies the produced energy for operating the apparatus.

12. The apparatus according to claim 1, comprising a pressure exchange unit, comprising at least one of the following features:

the pressure exchange unit transmits pressure between fluid propagating from the re-concentration unit to the ion exchange unit and fluid propagating from the ion exchange unit to the re-concentration unit;

the pressure exchange unit comprises at least one of the group consisting of a turbine, a booster, a Clark pump, and a Pearson pump.

13. The apparatus according to claim 1, is a closed cycle system in which at least part of the ions are recovered and reused within a closed cycle.

14. The apparatus according to claim 1 is at least one of the group consisting of a seawater desalinisation plant, a brackwater desalinisation plant, a portable, in particular backpack-based, apparatus for mobile water purification, a domestic water purification apparatus for purifying water for a building, an industrial water purification apparatus for purifying water for a plant, an agricultural water purification apparatus, a mining water purification apparatus, a municipal apparatus for purifying fluid, a naval apparatus for purifying fluid, an aircraft apparatus for purifying fluid, and a spacecraft apparatus for purifying fluid.

15. A method of purifying fluid using an apparatus of claim 1, the method comprising:

pre purifying the fluid to be purified by forward osmosis of the fluid to be purified through an osmosis membrane into a chamber comprising dissolved first ions;

subsequently exchanging at least part of the first ions by second ions by an ion exchange unit;

separating the pre-purified fluid after the ion exchange into purified fluid and into a re-concentrate enriched with the respective ions.

16. The apparatus according to claim 1, wherein at least part of the first ions are monovalent ions and at least part of the second ions are multivalent ions.

17. The apparatus according to claim 1, wherein the first ions comprise first cations and first anions and the second ions comprise second cations and second anions, and wherein the first cations are smaller than the second cations and/or the first anions are smaller than the second anions.

18. The apparatus according to claim 1, wherein the first ions comprise first cations and first anions and the second ions comprise second cations and second anions, and wherein the first anions and the first cations represent dissolved sodium chloride; and/or wherein the second anions and the second cations represent dissolved magnesium sulphate.

19. The apparatus according to claim 1, wherein the ion exchange unit reversibly exchanges at least part of the first ions by second ions.

* * * * *